March 6, 1928.

W. E. YEHLE 1,661,400

WATER BAG

Filed July 15, 1926

INVENTOR
William E. Yehle
BY
ATTORNEY

Patented Mar. 6, 1928.

1,661,400

UNITED STATES PATENT OFFICE.

WILLIAM E. YEHLE, OF NEW YORK, N. Y.

WATER BAG.

Application filed July 15, 1926. Serial No. 122,534.

This invention relates to improvements in water bags, more particularly to those capable of being rolled into a small space for transporting.

One object of the invention is to provide such a bag that can be used for watering graves and the like; a further object is to combine a novel sprinkler and funnel, in which the perforated rose is inverted and used as a strainer to prevent weeds, particles of wood, insects or other floating objects from entering the bag when the water is required for an automobile or for drinking or cooking purposes while camping or touring.

In the drawings accompanying the specification

Similar letters of reference refer to like parts in the several views.

The bag, 1, is preferably flat in shape provided with a handle, 2, at one side near the top and another handle, 3, at the bottom.

A mouth, 4, is placed at the upper corner as shown, the bag being reinforced at 1'. If the bag is made of soft or gum rubber the mouth is of the same material; if the bag is made of rubber cloth, pantasote or other pliable waterproof material, the mouth may be made of soft rubber or metal and suitably attached to the bag in any preferred manner.

The combined sprinkler and strainer, made of sheet metal consists of the removable rose, 5, perforated as usual, the flange, 5', being threaded; a wire, 6, is fastened to it for the purpose of screwing or unscrewing this perforated section to or from the funnel shaped body, 7, the tube, 7', fits into the mouth, 4, of the bag, the upper end of the body having a flange, 7'', threaded to engage the thread of the rose section, 5'.

When the bag is rolled up, a strap or band, 8, with a snap fastened may be used to keep it coiled.

Figure 1:
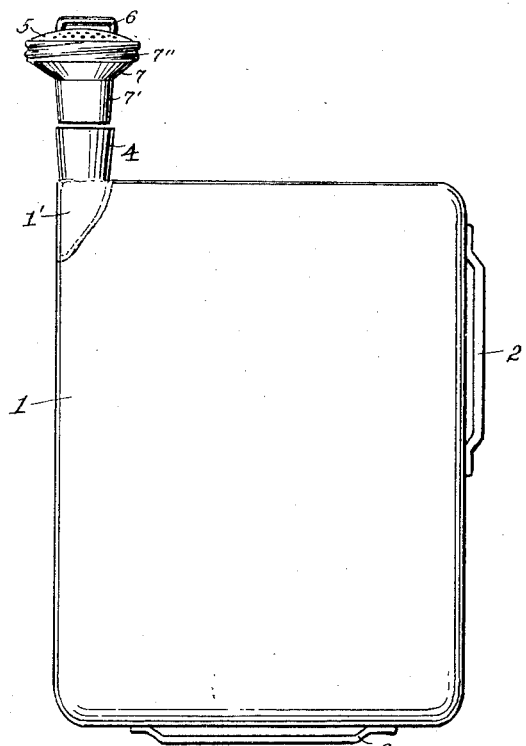
Fig. 1 is a side elevation of a bag made of gum rubber, rubber cloth, pantasote or any other suitable pliable waterproof material that can be rolled.
Figure 2:
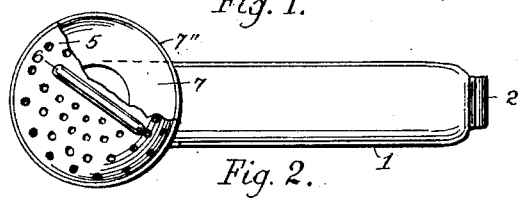
Fig. 2 is a top view of the same with the sprinkler, partly broken away, in position.
Figure 4:
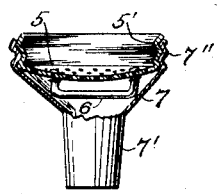
Fig. 4 shows the sprinkler head inverted to act as a strainer.
Figure 3:
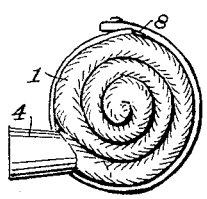
Fig. 3 shows a side view of the bag rolled up for carrying in the pocket, satchel, or automobile.

Such being the description, the operation is as follows:

If water is to be used for automobiles or purposes where clear water is required, the rose is inverted as shown in Fig. 4, the water passing through the perforated section which acts as a strainer; any weeds or other floating objects which would get into the rotary pump of the automobile or other parts of the mechanism is held back by the strainer; to pour water into the radiator opening, the funnel shaped body is removed from the bag, as shown in Fig. 1, and if another straining is desirable, it can be set into the radiator opening and the water poured through it.

Figure 5:
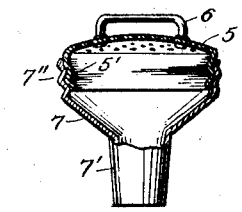
Fig. 5 shows the "rose" screwed into position as a sprinkler.

If used for watering flowers on graves or the like, the bag may be filled from a brook or other source, and the funnel shaped body with the rose screwed into position as shown in Fig. 5 is inserted into the mouth of the bag, and by grasping the two handles the bag will be prevented from collapsing and the sprinkling be done.

After using, the metal sprinkler body is removed, and the bag rolled up, the act of rolling forcing out any water that may be left through the mouth. To dry the bag it is hung up by the bottom handle and drained.

What I claim is:

1. In a watering device, a convertible sprinkler head and combined funnel and strainer comprising a perforated section having a single externally threaded cylindrical flange, and a funnel-shaped body section having an internally threaded cylindrical flange on its larger end adapted to removably reversibly receive the threaded flange of the perforated section.

2. The combination with a receptacle having a single filling and pouring mouth, of a convertible sprinkler head and combined funnel and strainer adapted to be removably applied to the filling and pouring mouth of said receptacle, said convertible sprinkler head and combined funnel and strainer embodying a funnel member having a cylindrical flange on its larger end, and a rose having a single cylindrical flange removably secured in the larger end of said funnel member and invertible therein to have its perforated wall positioned within said larger end of the funnel member to act as a strainer for the latter.

WILLIAM E. YEHLE.